March 20, 1956 A. BAUMANN 2,738,637
ATTACHMENT FOR A CORN PICKER
Filed Oct. 11, 1954 2 Sheets-Sheet 1
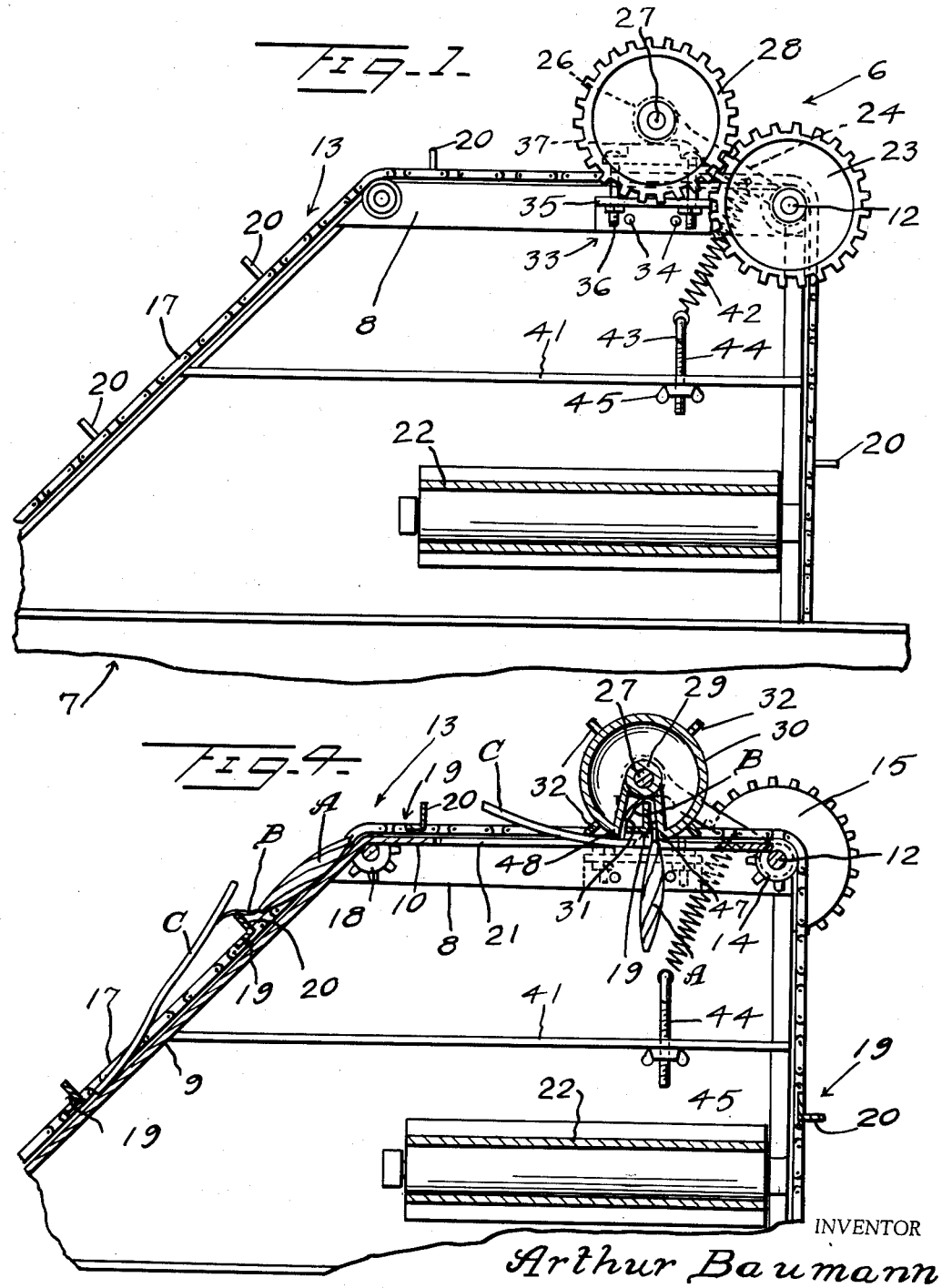
INVENTOR
Arthur Baumann
BY John N. Randolph
ATTORNEY

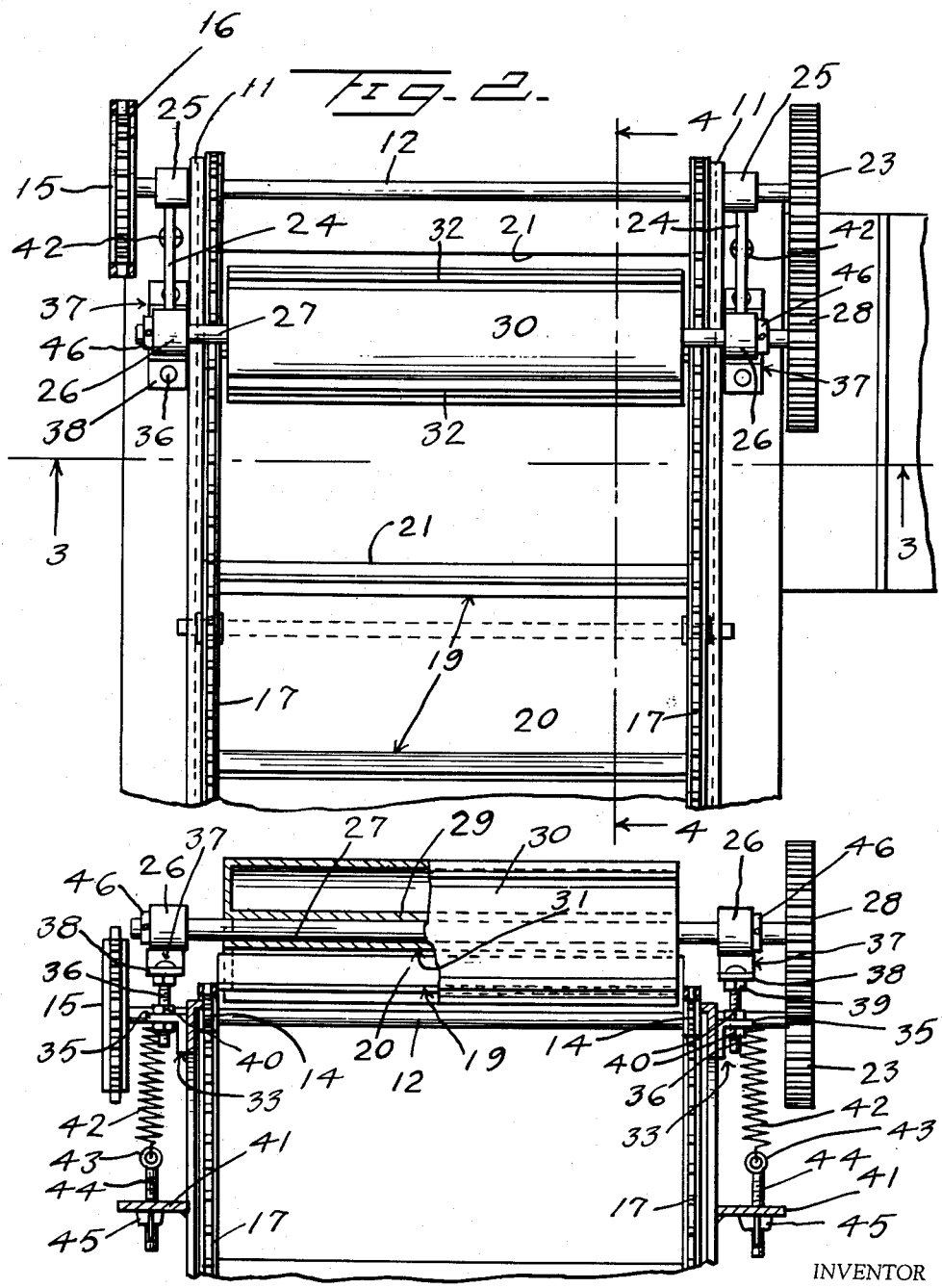

United States Patent Office 2,738,637
Patented Mar. 20, 1956

2,738,637

ATTACHMENT FOR A CORN PICKER

Arthur Baumann, Granite Falls, Minn.

Application October 11, 1954, Serial No. 461,308

7 Claims. (Cl. 56—104)

This invention relates to a novel attachment for a corn picker and more particularly to an attachment which functions with an elevator to positively insure separation of the ears of corn from the corn stalks to prevent loss of ears of corn in being discharged from the elevator behind the machine with the corn stalks.

More particularly, it is an aim of the present invention to provide a novel corn saving attachment having parts operating in timed relation with a corn picker elevator for effectively accomplishing a separation of the ears of corn from the corn stalks to thus effect separation and discharge of the ears of corn to a station from which the ears of corn may be conveyed to a husking station while permitting the passage of the corn stalks with the conveyor to a position to be discharged behind the machine.

A further object of the invention is to provide an attachment including a yieldable mounting for the elevator engaging part of the attachment to enable said part to rise away from the elevator to permit a large mass of corn stalks or frozen corn stalks to readily pass with the elevator beneath said attachment part.

Another object of the invention is to provide an attachment having means for adjustably supporting the elevator engaging part in a proper position relative to the elevator to most efficiently function in conjunction therewith.

Various other objects and advantages of the invention will hereinafter become more fully apparent from the following description of the drawings, illustrating a presently preferred embodiment thereof, and wherein:

Figure 1 is a side elevational view partly in section of the attachment shown in an operative position in relation to parts of a corn picking machine;

Figure 2 is a fragmentary top plan view of the attachment and associated parts of the machine;

Figure 3 is a front elevational view, partly in section, of the attachment, taken substantially along a plane as indicated by the line 3—3 of Figure 2, and showing a part of the machine in cross section, and Figure 4 is a fragmentary longitudinal sectional view taken substantially along a plane as indicated by the line 4—4 of Figure 2.

Referring more specifically to the drawings, for the purpose of illustrating a preferred application and use of the corn saving attachment, designated generally 6 and comprising the invention, a portion 7 of a conventional corn picking machine has been illustrated including spaced side frame members 8. A part of an inclined front wall 9 is supported by inclined forward edges of the frame members 8 and terminates at its upper rear end in a rearwardly extending top wall 10, which terminates adjacent upper rear corners of the frame members 8. The upper rear corners of the frame members 8 provide bearings 11 in which are journalled portions of a cross shaft 12. The cross shaft 12 constitutes a part of an elevator, designated generally 13, only a portion of which has been illustrated, and which includes sprocket wheels 14 which are fixed to the shaft 12 inwardly of and adjacent the bearings 11.

The shaft 12 extends outwardly to substantially beyond the bearings 11 and has a larger sprocket wheel 15 fixed to one end thereof. A suitable drive chain 16, only a portion of which has been illustrated in Figure 2, is trained over and drives the sprocket wheel 15 for driving the elevator shaft 12. The elevator 13 includes two transversely spaced endless chains 17, portions only of which have been illustrated, which are trained over the driving sprocket wheels 14 and over other idler sprocket wheels, only two of which, designated 18, have been illustrated. Corresponding portions of the elevator chains 17 are connected by rigid cross members 19 each of which includes an upstanding flange or slat 20, which extends outwardly from the chains 17. The top wall 10 is provided with a relatively large opening 21 of a width substantially equal to the spacing between the chains 17 and which extends a substantial distance lengthwise of said chains. A conventional conveyor 22 is mounted beneath the opening 21 and constitutes a receiving station for the ears of corn, not shown, and extends under one of the frame members 8 for conveying the ears of corn from beneath the elevator 13 to any suitable location such as a husking unit or husking station, not shown. As seen in Figures 1 and 4, the elevator 13 extends downwardly from the drive sprocket wheels 14 which are thus located at the upper rear end of said elevator. The parts previously described, numbered 7 to 22, inclusive, constitute no part of the present invention but have merely been illustrated and briefly described to afford an understanding of the mounting and operation of the corn saving attachment 6.

Said corn saving attachment 6 comprises a timing gear 23 which is fixed to the other end of the shaft 12. A pair of arms 24, of the attachment 6, have bearings 25 at corsponding ends thereof which turnably engage on and are supported by the shaft 12 between its bearings 11 and the sprocket wheel 15 and timing gear 23. The opposite ends of the arms 24 are provided with bearings 26 forming journals for end portions of a shaft 27. One end of the shaft 27 extends outwardly from one of the bearings 26 and has a second timing gear 28 fixed thereto and disposed in meshing engagement with the timing gear 23. The arms 24 are of a proper length to support shaft 27 spaced a proper distance from the shaft 12 so that the timing gears 28 and 23 are in mesh and so that said arms 24 and the shaft 27 can swing as a unit on the shaft 12 and while retaining the timing gear 28 in meshing engagement with the timing gear 23.

The shaft 27 extends through and is secured to the axial hub 29 of a drum 30 which is thereby fixed to the intermediate portion of the shaft 27. The drum is disposed between portions of the chains 17 and is of a length only slightly less than the spacing between said chains. The drum 30, as best seen in Figure 4, is provided with a recess or indentation 31 which extends from end-to-end thereof and which opens outwardly of the ends of the drum 30 and of a portion of the periphery thereof. The recess or depression 31 preferably increases in width toward the part thereof which opens outwardly of the drum periphery and said outwardly opening part is of a width, circumferentially of the drum, slightly greater than the width of the base portions of the cross members 19. The depression or recess 31 is of a depth greater than the height of the elevator part 20, as seen in Figure 4. The drum 30, except for the recess or depression 31, has a completely closed periphery and is preferably provided with longitudinally extending circumferentially spaced cleats 32 which project outwardly from the drum periphery.

Bracket members 33, preferably formed of angle iron, are secured by fastenings 34 or in any other suitable manner to the outer sides of the frame members 8, adjacent the top portion 10. The brackets 33 have outwardly extending top flanges 35 through which threaded bolts 36 loosely extend. A pair of bolts 36 is associated with each bracket 33. Each of the pairs of bolts 36 support a bearing block 37 at the upper end thereof. The bolts 36 extend through end portions of the bearing blocks 37, which end portions 38 are clamped between the bolt heads and nuts 39 which are threaded on said bolts. Each bolt 36 carries a pair of clamping nuts 40 which engage above and beneath the flange 35 for securing the bolt 36 thereto, and which are adjustable on the bolt for raising or lowering the bolt relatively to said flange 35. Thus, the bearing blocks 37 are individually adjustable vertically by the pair of supporting bolts 36 individual thereto, and are disposed beneath the bearings 26 and positioned so that said bearings 26 rest thereon, to thus limit the extent that the arms 24 can swing downwardly, to thereby support the shaft 27 and drum 30 at a desired elevation relative to the part of the elevator 13 which is disposed beneath said drum.

Bars 41 are fixed to the sides of the frame of the machine 6, beneath the frame members 8. A contractile coiled spring 42 is connected to each of the arms 24. The springs 42 extend downwardly from the arms 24 and have lower ends secured to eyes 43 of bolts 44. The bolts 44 extend downwardly from the springs 42 loosely through the bars 41 and have wing nuts 45 adjustably threaded thereon and bearing against the undersides of the bars 41. It will be readily apparent that the wing nuts 45 may be adjusted on the bolts 44 to vary the tension of the springs 42 and the extent that the springs will yieldably urge the bearings 26 downwardly against the adjustable bearing supports 37. Collars 46 may be detachably fixed to the shaft 27 to bear against the bearings 26 to prevent sliding movement of said shaft relatively to said bearings.

The timing gears 23 and 28 are of the same diameter and have the same number of teeth so that the shafts 12 and 27 will turn at the same speed. The cross members 19 of the elevator 13 are spaced apart a distance such that successive cross members 19 will assume positions beneath the shaft 27 at each revolution of said shaft and the drum 30. The drum 30 is initially adjusted relative to the elevator 13, as illustrated in Figure 4, so that its recess 31 is disposed to open downwardly when a cross member 19 is disposed directly beneath the shaft 27 and accordingly in said recess 31. The number of chain links between adjacent cross members 19 of each chain 17 corresponds to the number of teeth in the sprocket wheels 14. Accordingly, assuming that the shaft 12 is being driven clockwise as seen in Figure 4, the timing gear 23 will turn clockwise as seen in Figure 1 and will drive the timing gear 28, the shaft 27 and drum 30 counterclockwise, as seen in Figure 1. Thus, the elevator 13 will travel from left to right toward the drum 30, as seen in Figures 1 and 4 and as the recess 31 travels in a counterclockwise direction toward its lowermost position of Figure 4 during each revolution thereof, a cross member 19 will enter the downwardly traveling recess 31 and will move from left to right as seen in Figure 4 out of engagement with the recess 31 as said recess moves upwardly in a counterclockwise direction from its lowermost downwardly opening position of Figure 4.

While the elevator 13 is intended to carry ears of corn A only from means, not shown, of the machine by which the ears of corn are intended to be separated from the stalks C, it frequently occurs that the stalks or broken off pieces thereof to which the ears of corn remain attached by their stems B are fed onto the elevator 13. The ears of corn A engage on the inclined wall 9 between the chains 17 and the cross members 19 so that these ears of corn are pushed up the wall 9 by a slat 20 disposed therebelow and onto the top surface 10 from which the ears of corn A are discharged by gravity through the opening 21 onto the conveyor 22, before reaching the drum 30. However, ears of corn A attached to a corn stalk or corn stalk part C by a stem B are also conveyed in the same manner by the elevator 13 and the stems B usually extend backward over the slat 20 by which the ear of corn is being pushed and the corn stalk C or a part thereof is pulled by the stem B behind the slat 20 which is propelling the ear A. Accordingly, when such ears of corn reach a position over the opening 21 they are suspended in said opening by the stem B and stalk C which are supported by a cross member 19 and thus do not fall by gravity onto the conveyor or ear corn receiving station 22. Rather, in the conventional operation of the elevator 13, such ears of corn are carried onward and are discharged with the stalks to which they are attached behind the machine as the cross members 19 supporting such attached ears and stalks pass over the shaft 12 and commence their downward travel therefrom. This constitutes the conventional operation of the elevator 13 for disposing of the stalks. However, many ears of corn are thus discharged with the stalks and thereby lost.

However, with the attachment 6 such loss of ears of corn is eliminated. As an ear of corn A attached by its stem B to a stalk or a piece of the stalk C approaches the drum 30, suspended by one of the cross members 19, said cross member 19, as previously described, will enter the downwardly traveling drum recess 31 and the leading edge 47 of the open outer part of the recess 31 will contact the ear which is in advance of the cross member 19 which is entering the recess 31. Thereafter, the other trailing longitudinal edge of the open outer end of the recess 31, designated 48, will contact the stalk C to which the ear A is attached and as the recess 31 reaches its lowermost position as illustrated in Figure 4, the edges 47 and 48 will exert sufficient pressure against the ear and stalk to separate the ear A from the stem B and to permit the ear to drop onto the conveyor or station 22. However, the stem and stalk will be held by the recess portions 47 and 48 in engagement with the cross member 19, which is in the recess 31, and will thus be caused to continue their travel with said cross member 19. Where the cleats 32 are provided, said cleats will successively move into engagement with the stalk or stalks during the upward counterclockwise travel of the recess 31 and as the cross member 19 moves out of engagement therewith, to insure continuation of the movement of the stalk with the elevator member 19 over the shaft 12 so that the stalk will be discharged as waste behind the machine. However, if desired, the cleats 32 may be omitted and the stalks and stems will still be discharged as previously described, but with somewhat reduced efficiency.

Sometimes it occurs that such a mass of stalks approach the drum simultaneously that the operation as previously described may not be accomplished with the drum 30 in its position of Figure 4. Under such conditions, where a mass of stalks are overhanging a slat 20 as it approaches the drum 30, as the stalks are contacted by the downwardly traveling leading edge 47, the drum 30 will be forced upwardly thereby causing the arms 24 to swing about the shaft 12 against the action of the springs 42 in a clockwise direction as seen in Figures 1 and 4, to thus permit the stalks to pass under the drum toward the shaft 12. During this swinging movement of the arms 24, shaft 27 and drum 30 the timing gears 23 and 28 will remain in mesh so that after a mass of stalks have passed between the drum 30 and the cross member 19, the drum 30 will resume its position as illustrated in Figures 3 and 4, with the bearings 26 resting on the bearing supports 37 and the drum 30 will have continued to revolve so that the recess 31 will assume a proper position to receive the next approaching cross member 19. During cold weather corn stalks are frequently frozen and are thus rendered very stiff or rigid so that when the attachment 6 is employed under such conditions the drum 30 will be required to yield upwardly as previously described to permit the passage of frozen stalks therebeneath.

The adjustable supports 37 are vertically adjustable as previously described and support the drum 30 at a correct elevation so that successive cross members 19 may readily pass through the recess 31 thereof and so that the drum portions 47 and 48 will extend downwardly a sufficient distance relative to the cross members 19, as illustrated in Figure 4, for effectively separating ears of corn from stalks. The springs 42 can be adjusted by turning the wing nuts 45 to vary the tension thereof to best suit various working conditions which may be encountered.

Various modifications and changes are contemplated and may obviously be resorted to, without departing from the spirit or scope of the invention as hereinafter defined by the appended claims.

I claim as my invention:

1. In combination with an elevator of a corn picking machine including spaced chains trained over sprocket wheels secured to a driven shaft and a plurality of cross members connecting corresponding portions of said chains and disposed in spaced apart relation relative to one another longitudinally of the chains, an attachment for use with said elevator comprising a pair of arms having corresponding ends swingably mounted on said shaft, said arms having bearings defining opposite, free ends thereof, a shaft journalled in said bearings, a drum fixed to said last mentioned shaft for rotation therewith and having a portion normally disposed between said elevator chains, said drum having a recess extending from end-to-end thereof opening outwardly of a portion of the drum periphery, and timing means connecting said shafts for causing the drum to rotate in a predetermined timed relation to said first mentioned shaft and with the bottom half of the drum turning in a direction corresponding to the direction of movement of the adjacent portion of the elevator whereby each of the cross members of the elevator will enter the drum recess and travel therein during movement of said cross member beneath the last mentioned drum shaft for separating ears of corn from corn stalks being conveyed by said cross member of the elevator.

2. In an attachment as in claim 1, a portion of said drum recess opening outwardly of the drum periphery and being of a width greater than the width of the cross member and substantially less than the diameter of said drum.

3. In an attachment as in claim 1, and spring means connected to said arms and anchored to the machine for yieldably urging said arms to swing in a direction for displacing the drum toward the adjacent portion of the elevator and permitting the drum to yield with the arms and drum shaft away from the elevator.

4. In an attachment as in claim 3, and means anchoring the spring means to the machine for varying the tension of said spring means.

5. In an attachment as in claim 1, bearing supports mounted on the machine and on which said bearings normally rest for supporting the drum and drum shaft at a desired elevation relative to the adjacent portion of the elevator.

6. In an attachment as in claim 5, and means adjustably supporting said bearing supports on the machine for varying the elevation of the drum and drum shaft relative to the adjacent elevator portion.

7. A machine as in claim 1, a plurality of longitudinally extending circumferentially spaced cleats projecting outwardly from the periphery of said drum in circumferentially spaced relation to the drum recess.

References Cited in the file of this patent

UNITED STATES PATENTS

| | | |
|---|---|---|
| 103,779 | Rice | May 31, 1870 |
| 1,487,916 | Brown | Mar. 25, 1924 |
| 1,833,138 | Synck | Nov. 24, 1931 |
| 2,515,808 | Stoddard | July 18, 1950 |
| 2,629,978 | Krause et al. | Mar. 3, 1953 |
| 2,676,450 | Schaaf et al. | Apr. 27, 1954 |